(12) United States Patent
Hurtig

(10) Patent No.: US 6,527,291 B1
(45) Date of Patent: Mar. 4, 2003

(54) UPRIGHT COMFORT BICYCLE WITH IMPROVED SAFETY

(76) Inventor: Carl R. Hurtig, 58 Gammons Rd., Cohasset, MA (US) 02025

( * ) Notice: Subject to any disclaimer, the term of this patent is extended or adjusted under 35 U.S.C. 154(b) by 0 days.

(21) Appl. No.: 09/678,925

(22) Filed: Oct. 4, 2000

Related U.S. Application Data

(60) Provisional application No. 60/158,455, filed on Oct. 8, 1999.

(51) Int. Cl.$^7$ ................................................ B62K 3/02
(52) U.S. Cl. .................................... 280/288.1; 280/287
(58) Field of Search ................................ 280/274, 287, 280/281.1, 288, 288.1, 220, 226.1; 297/215.12

(56) References Cited

U.S. PATENT DOCUMENTS

| | | | |
|---|---|---|---|
| 2,482,472 A | * | 9/1949 | Fried .......................... 180/19.1 |
| 4,475,770 A | * | 10/1984 | Persons, II ............. 297/215.12 |
| 4,480,848 A | * | 11/1984 | Georgiev |
| 4,659,098 A | * | 4/1987 | Jacobson |
| 4,789,173 A | * | 12/1988 | Lofgren et al. |
| 4,925,203 A | * | 5/1990 | Buckler |
| 5,261,686 A | * | 11/1993 | Buckler |
| 5,290,054 A | * | 3/1994 | Po |
| 5,509,678 A | * | 4/1996 | Ullman et al. |
| 5,584,494 A | * | 12/1996 | Krumm .................... 280/288.1 |
| 5,853,062 A | * | 12/1998 | Hulett |
| 5,887,943 A | * | 3/1999 | Lee .......................... 297/215.1 |

OTHER PUBLICATIONS

*Ramsey/Sleeper Architectural Standards*, Seventh Edition, Robert T. Packard, AIA, Editor, The American Institute of Architects, copyright 1981 by John Wiley & Sons, Inc., pp. 2–6, Anthropometric Data and Work Stations, 1 Design Elements.

*Bicycling Science, Ergonomics and Mechanics, Frank Rowland Whitt and David Gordon Wilson, The MIT Press*, ©1974, pp. 158–161.

*Federal Register, Consumer Product Safety Commission, Part IV, Bicycles, Republication of Safety Standard, vol. 41, No. 19, Wednesday, Jan. 28, 1976.*

* cited by examiner

*Primary Examiner*—Kevin Hurley
(74) *Attorney, Agent, or Firm*—Weingarten, Schurgin, Gagnebin & Lebovici LLP

(57) ABSTRACT

This bicycle, novel in both functionality and design, is a modified upright bicycle, which, because it incorporates a seat which is adjustable along an inclined Seat Beam, provides optimum dimensions for each individual rider. In addition, it exhibits improved safety, maneuverability, comfort and efficiency of operation.

18 Claims, 7 Drawing Sheets

UPRIGHT COMFORT BICYCLE WITH IMPROVED SAFETY

CROSS REFERENCE TO RELATED APPLICATIONS

This application claims priority from U.S. Provisional Application Ser. No. 60/158,455, filed Oct. 8, 1999, which is incorporated in its entirety herein.

BACKGROUND OF THE INVENTION

Upright bicycles have several inherent dangers. First, because of the center of gravity of the bicycle and rider, the rider risks being thrown over the handlebar during sudden braking. Second, because of the location of the seat, the rider cannot put both of his feet on the ground for assisting in balancing, and falling to one side is a frequent cause of injury.

Furthermore, existing bicycles are limited in the amount of size adjustments possible, and the rider needs to obtain a specific bicycle (frame size) to accommodate his size. In addition, because of seat design and limits in seat adjustment, bicycles are often uncomfortable.

BRIEF SUMMARY OF THE INVENTION

This invention relates to a novel type of bicycle, which exhibits improved safety, maneuverability, comfort and efficiency of operation. It should not be confused with a recumbent bicycle, which, as discussed further herein, is quite different. Instead, it is a totally new bicycle, both in functionality and design.

This novel bicycle is a modified upright bicycle, which, because it incorporates a seat, which is adjustable along an inclined Seat Beam, provides optimum dimensions for each individual rider.

DETAILED DESCRIPTION OF THE INVENTION

Figure 1:
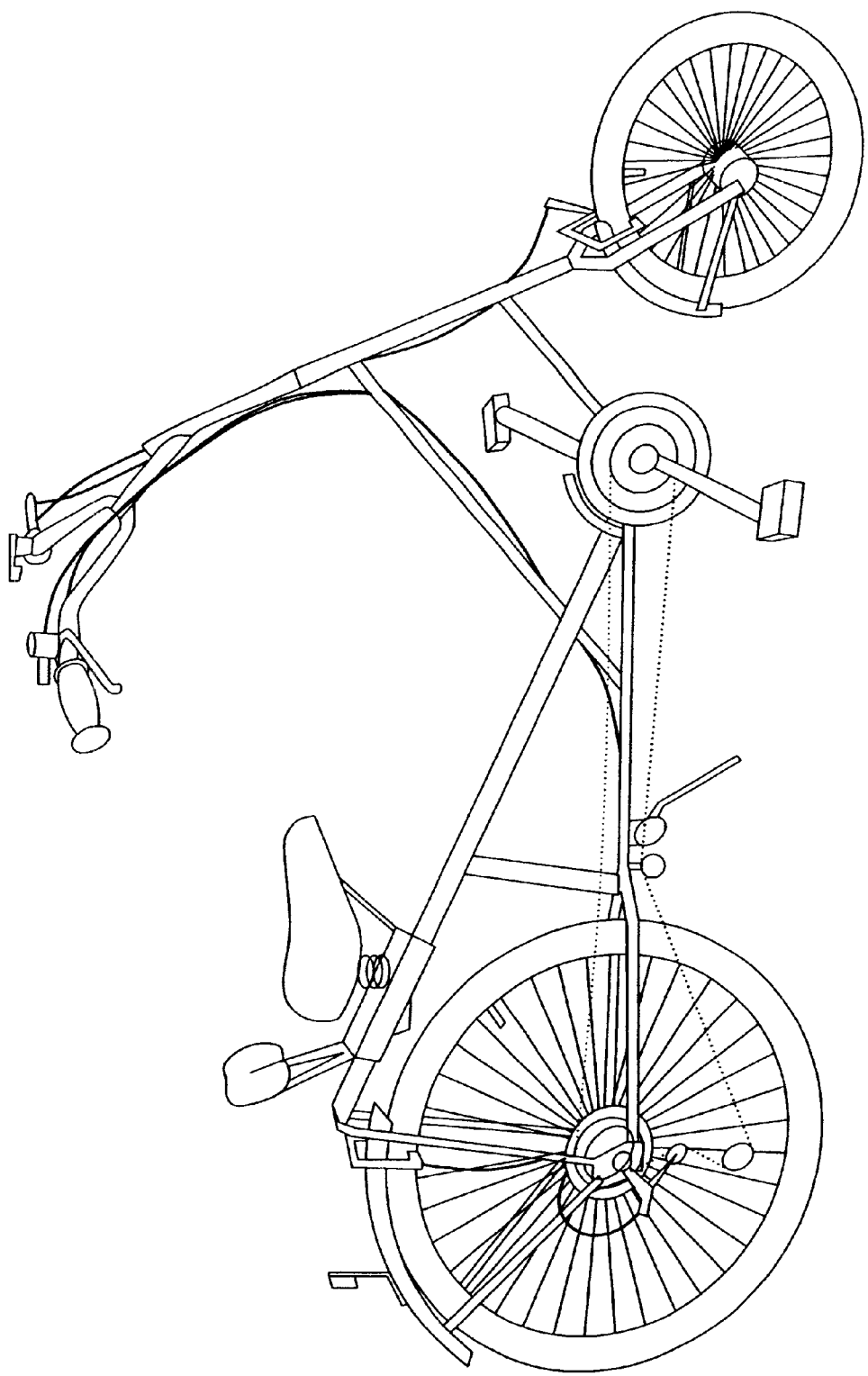
FIG. 1 shows the side view of an assembled bicycle.

The Upright Comfort Bicycle is shown in FIG. 1. Inasmuch as this bicycle has a small front wheel and a larger rear wheel, the Bicycle Industry may classify this bike as a recumbent design. However, since the rider of this bike sits in an upright position with feet forward and down at an angle, there is nothing about the rider position that suggests recumbence. Therefore, this novel bicycle is referred to as an Upright Comfort Bicycle.

Important features of this Upright Comfort Bicycle include the following performance benefits:

1. Eliminates fear of falling. In comparison to traditional road or racing bicycles, the position of the rider has been lowered and moved farther back from the front axle. The rider is seated in an upright position with his/her hip socket located in the range of 65% to 90% of the hip joint position when standing. This permits the rider to move his feet from the pedals to the ground and to easily touch the ground laterally away from the bike frame. At this location, the leg is positioned to stabilize the rider and the bike from falling over sideways. With this ability much of the fear of falling is eliminated. Riding in the rough edges of roadways, skidding in sandy areas, hitting obstacles such as tree branches, turning on gravel patches are of much less concern to the rider.

2. Provides more effective and safer braking. In almost all bicycle designs the front wheel brakes provide the largest percentage of the total braking force. In traditional road and racing designs great care must be exercised "to avoid going over the handlebars" i.e. "pitch poling". In many traditional designs a braking force on the front wheel in excess of 0.5 g will cause this result. The coefficient of friction of rubber on dry clean black top or concrete is 0.8. In this design, by lowering the center of gravity of the person on a bike and moving the center of gravity farther back of the front wheel axle (or the contact point of the front wheel on the ground) improvements in the braking forces are possible. Safe braking forces are approximately 1.6 times larger than that of traditional bicycle designs.

There are additional concerns with applying excessive braking force even though a rider may not "pitch pole". If braking forces exceed the coefficient of friction of the riding surface, then the wheel or wheels of the bike may lockup and skidding will result. In conventional designs, skidding may also result in a spill. With the ability of the rider to put his legs out laterally from the bike, a skid may be prevented.

Wet pavements or a layer of sand on blacktop will significantly reduce the coefficient of friction of a biking surface. Smooth concrete surfaces of a warehouse also have lower coefficients of friction than paved or concrete roadways.

3. Provides a large padded, spring-loaded seat. A wide seat together with an upright position can greatly reduce the problems of strain in the pelvic region of a rider.

4. Efficiency of pedaling. In most traditional bicycles the bicyclist often stands on the pedals and leaves the seat (significantly changing the location of his center of gravity) to achieve greater pedaling force for short distances. In this design it is virtually impossible to stand on the pedals. The strongest muscle group of a rider is the leg group. By adding a hip support at the rear of the seat the leg muscle group can be locked to the frame of the bike. With the proper adjustment of the back of the seat (the hip pad) the riders can achieve a high ergonometric efficiency even though the rider cannot stand on the pedals (does not change the location of his center of gravity). The Consumer Product Safety Commission in 16 CFR Ch. L1 (Jan. 1, 1994 Edition) paragraph 1512.15 specifies that "no part of the seat, seat supports, or accessories attached to the seat shall be more 125 mm (5.0 in.) above the top of the seat surface at the point where the seat surface is intersected by the seat post axis". This regulation is difficult to interpret for a bicycle as described herein. The traditional seat post has been eliminated and therefore there is no intersection. However, an interpretation that limits the height of the seat back as if there were a traditional seat post appears to be conservatively proper. Apart from the CPSC, it is also important that this hip pad is designed to be in contact with the hip muscle and not the lower portion of the spine.

5. Commercial shipping. A large amount of commercial shipping is now done by such companies as UPS, Federal Express and many others. In general, all of these companies have regulations on the maximum size of a box they will handle. Since a common manner of shipping bicycles to Independent Bicycle Retailers is by means of these companies, it is important that the bike fit within the maximum size. There are techniques for shipping oversize boxes, but special arrangements must be instituted. These arrangements are often difficult to have universally accepted by local branches. In particular, UPS regulations require that a box have a "maximum size per package— 130 inches in length and girth combined, with a maximum length of 108 inches per package". A considerable amount of time has been spent to achieve a design that fulfills this requirement with the additional requirement that the bike be shipped as fully assembled as possible.

6. Shipping Package. See comments on commercial shipping. There are a variety of different combinations of frame and fork designs together with wheel sizes that may be used to permit the bike to fit into a shipping box. Also there are a variety of degrees of assembly of the bike that are possible. The more complete the assembly of the bike that is shipped the less assembly the retailer or consumer (e.g., internet buyer) has to perform at his location and the lower the cost to the final customer.

7. One Frame Fits Almost All Adults. With the design shown over 95% of the adult population of America, as defined by the seventh edition of Architectural Graphic Standards by Ramsey/Sleeper of the American Institute of Architects, are capable of fitting this one frame size. Excluded from the population that fits this frame size are 2.5% of the tallest male population and less than 2.5% of the smallest female population.

8. Children's Size. A second frame size has been designed. This frame is intended for children in the range of 3.5 to 5 ft. tall. It is a simpler design with a single speed drive and a combination of rear coaster brake and a front hand brake.

9. Balance. There are several interesting balance features of this design. First there is the ability to balance the bike laterally by the use of the rider's feet. Second, there is a fair degree of balance of the bike if lifted by the ends of the handlebars. This permits a rider to lift the bike over an obstacle such as a curbstone by simply standing and straddling the bike. The degree of balance is affected by the seat and handlebar height adjustments. There is a first order balance of the various masses on the front wheel. The front wheel is designed with a rake or offset to place the front wheel forward of the axis of rotation of the wheel about the steering column. The design of the stem and handlebar is to the rear of this steering axis. There is a first order balance of these two masses such that there is a significant reduction of rotational (unbalanced) forces of the wheel assembly. On a traditional bicycle, the wheel tends to tilt to one side. On the novel bicycle, the wheel will experience minimal tilting, thus demonstrating improved balance about the steering column. This balance reduces second order forces on the steering mechanism. This balance reduces second order reactionary forces caused by the ground on the steering mechanism.

10. Lateral stability range. In order to achieve lateral stability the rider must be capable of touching the ground with each of his legs. There is no absolute distance laterally from the longitudinal axis of the bike that a rider must reach. It may be sufficient that a rider be able to touch his toe to the ground. However for comfort and for strength it seems apparent that the rider should be able to place his foot flat on the ground when stopped. To achieve this requirement, the hip joint should be located at 90% or less of the hip joint height when standing. To have the leg in a position that is proper for high strength the hip joint should be located at much higher than the height of a normal sitting height wherein the hip joint is at approximately 50% of the height when standing. Accordingly the lower limit for the hip height when sitting on the bike is approximately 65%.

In a recumbent bike, dismounting is analogous to getting out of bed. Because of the prone leg position lateral stability is hard to achieve.

Figure 5:
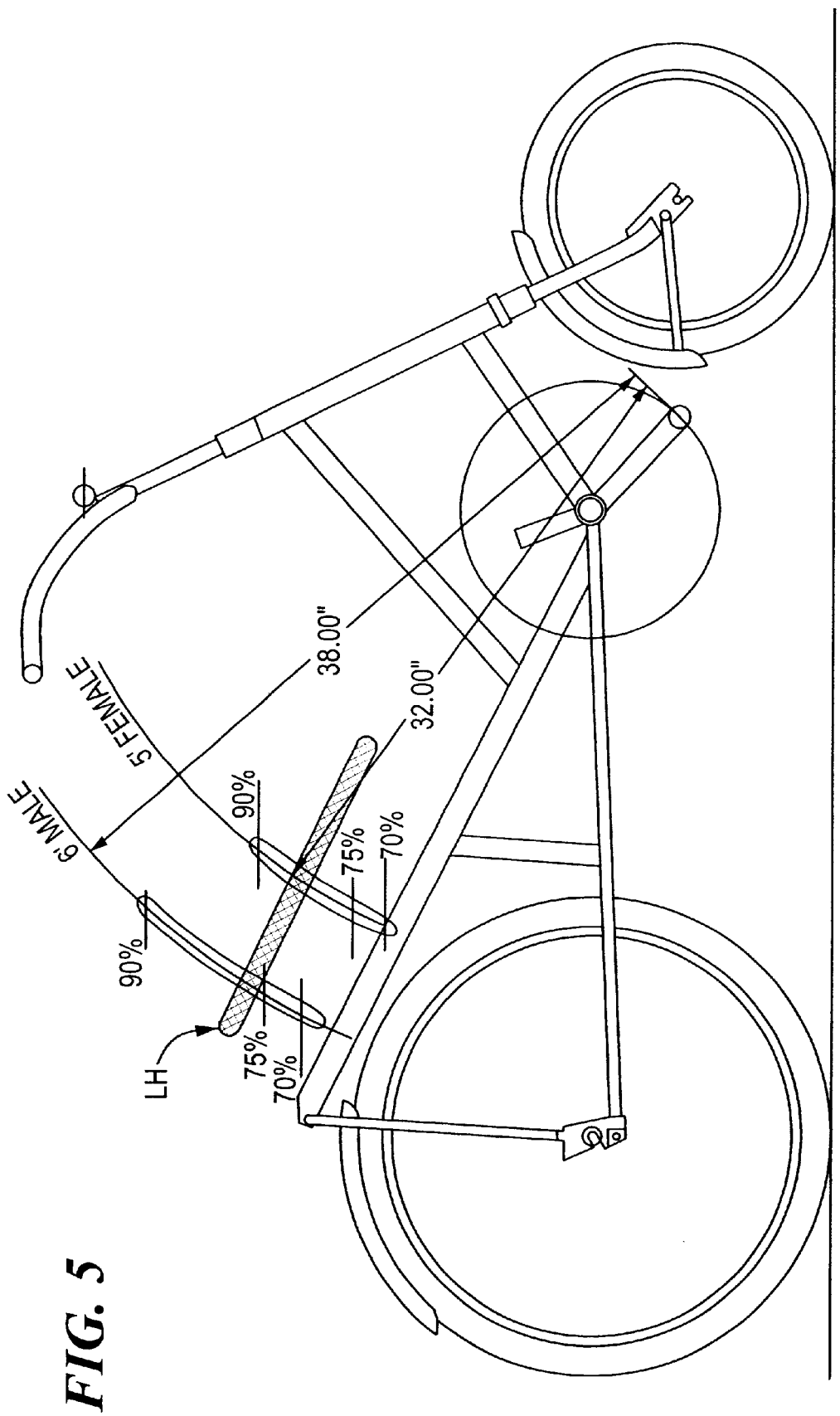
FIG. 5 shows the location of the seat for two different-sized people.

The possible locations of the hip joint for two different classes of riders is shown in FIG. 5. These classes are: one, a six-foot male and the second, a five-foot female. For each class an arc has been drawn from the pedal (at the extended position) with a radius of the standing hip height. On each of these arcs the are three short horizontal lines drawn that represent the 70%, 75% and 90% heights of each of these two classes. The shaded area shows one possible locus that is parallel to the Seat Post and intersects the possible hip joint location for each class. The seat is designed to fill the gap between the Seat Beam and the shaded area. The range of riders of this bike includes males to 75 inches (arcs not shown in FIG. 5). It should be obvious that bikes may be designed with a wide range of angles of the Seat Beam. The angle of the Seat Beam in this drawing is ~23 degrees. It should be obvious that angles as high as 40 degrees are possible. The use of a smaller rear wheel would permit the use of lower angles. Although not obvious, the use of a lower angle of the Seat Beam may allow the range to be extended to include taller riders and allow the bike to fit into a maximum size shipping box.

The actual selection of angle of the Seat Beam is a balance of countervailing forces, namely (1) optimum lateral stability is achieved when the angle is high, and (2) optimum longitudinal stability is achieved when the angle is low.

11. Longitudinal stability. The problem of pitch poling has been understood for a long time. This problem has been described at length in Bicycling Science by Witt and Wilson in two editions (1974 and 1982) and also by many other writings. Witt and Wilson show that the maximum safe braking force for typical bicycles existing at that time, before pitch poling, is 0.56 g on a level surface. Thus, in this example, only 70% of the useful braking force may be applied before skidding (0.8 g). Witt and Wilson do not demonstrate the effects of hills in their discussion. However, it is known that longitudinal stability is reduced when the road surface is sloped downhill. As the downward slope increases, the maximum braking force to avoid pitch poling should is reduced well below the 0.56 g mentioned above. In their example, a hill with a downward slope of 10 degrees reduces the safe braking force to a value of 0.46 g, or only 58 percent of that allowed by a dry road surface. On a hill with a slope of 20 degrees the maximum braking force is 0.36 g, or only 45 percent of that allowed by the road surface.

The availability of aluminum wheel rims and linear cantilever brakes have significantly improved the ability of a rider to apply braking forces. These components are reasonably effective in the rain. As a result of these improvements it is easier for a person to apply higher braking forces than with older components. These improvements do cause some concern and caution. Some bike storeowners will not adjust the front brakes to provide the maximum possible braking forces as a precautionary measure to prevent pitch poling with conventional bicycles.

In this novel design, the rider is placed farther back from the ground contact of the front wheel and is also seated lower than in a road or racing bike. The center of gravity of the rider is thereby lowered and moved towards the rear. It is estimated that the safe allowable g force that could be applied before pitch poling is 1.25 g. This of course is misleading, the maximum force that may be applied on pavement is 0.8 g without skidding. The maximum forces that may be applied by a rider is limited by his finger strength and the leverage of the braking system on the bike the rim. The significance of the safe number above is that the bike will not pitch pole on a level surface with braking forces up to 0.8 g. The real value of this design is braking downhill. The estimated longitudinal stability factor of 1.25 g is reduced to 1.03 g on a hill with a angle of 10 degrees. On a hill with a slope 20 degrees the maximum safe force is reduced to 0.8 g, which is the maximum force without skidding.

Riding on polished concrete floors of a warehouse is one example of improved stability. The coefficient of friction on polished surfaces is greatly reduced. Even at low velocities braking is difficult, and skidding is the result. The ability of a rider to place his feet on the surface has shown its effectiveness.

The functional attributes of the novel bicycle include the following:

1. Fenders. The obvious reason for fenders is to provide some shielding from wet pavements, and indeed almost all street bikes from decades ago were equipped with fenders. The newer mountain bikes and almost all juvenile bikes are sold without fenders. Recreational or fitness riders who are interested in comfort will appreciate some splash protection. Riders commonly stay to the right of a road where the passage of cars and rain cause road debris to accumulate.

The traditional and obvious location of the rear reflector is at the top of the seat stays. A rider's jacket or other apparel may easily cover the rear reflector; the rear reflector is moved away from the seat stays and is mounted farther to the rear on the rear fender.

Earlier bike designs employed a rear fender that had a length that covered more than 90 degrees of the wheel. In the recent designs a fender length that covers less than 90 degrees is used. This shorter fender length results from the compromises to fit an almost fully assembled bike and meet the UPS requirements. Those versed in the art of design can readily achieve other designs to accomplish a similar but different results. The use of a smaller rear wheel would permit a longer fender but change other characteristics such as friction forces of the smaller wheel on the ground or clearance to the ground.

Figure 2A:
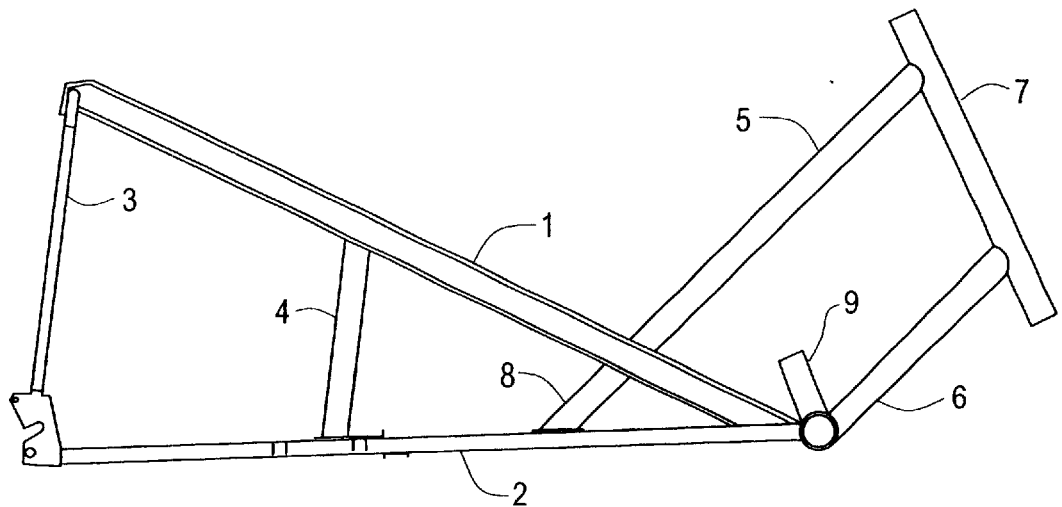
FIG. 2A shows the basic design of the frame, including the components thereof.
Figure 2B:
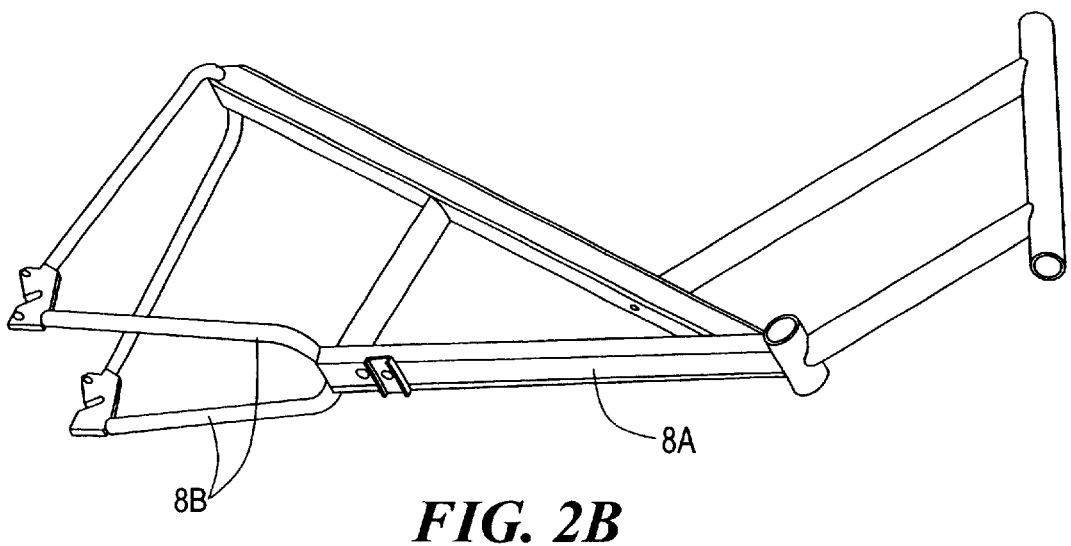
FIG. 2B shows a variation thereof.

2. Frame. A drawing of the frame is shown in FIG. 2A. The main support structure for the rider consists of a triangle formed by the Seat Beam 1, the Chain Stays 2, and the Seat Stays 3. This triangle is reinforced by the Mid Tube 4. The Seat Beam is generally a square (or triangular) tube with corners that have small radii. (See also paragraph 8, hereafter.) The seat assembly is mounted on the Seat Beam and is adjusted between the Seat Stays and the Mid Tube. (It is also possible to move the seat lower than the Mid Tube.) The angle between the Seat Beam and the ground is between approximately 18 and 40 degrees, preferably between 20 degrees and 30 degrees and most preferably approximately 23 degrees. (These ranges are for a novel bicycle having a 24" rear wheel.) The angle between the Mid Tube and a vertical line is not of great importance and has been both positive and negative. The angle does not materially affect the range of sizes of riders nor the strength of the frame. The Top Tube 5 and the Down Tube 6 support the Head Tube 7 (which holds the steering mechanism of the bike). The Extension of the Top Tube 8 is not a significant member. The inclusion is a matter of looks, cost and the type of welding or brazing that is employed. The Front Shifter Stub 9 permits the mounting of a front shifter. The angle and length are not of critical importance. The preferred method of welding is TIG (Tungsten Inert Gas) welding. One variation of the frame is shown in FIG. 2B, where the Extension of the Top Tube (8) has been eliminated, and the front portion of the Chain Stay 8A is now a flattened oval piece (alternative shapes, for example an oval or a rectangle are also possible), connected to a rear portion 8B, which passes on both sides of the rear tire. Other variations in the frame design that are consistent with the confort bicycle will be recognized by those with expertise in the area. The common theme is the use of a long horizontal frame rather than a short vertical frame. Aside from variations in the overall design, variations in components are also possible. For example, oval or triangular tubes can be used in place of round tubes.

3. Fork. From FIG. 1, it can be noticed that the front fork has one unique characteristic. The amount of metal material and the angle of the fork blades has been designed so that the fork, when turned 180 degrees for shipping (wheel and fender removed for shipping) has the minimum forward projection, that is, takes the least space in the longitudinal dimension. The drop outs and the rear edge of the fork blades determine the corner of the shipping box.

4. Seat Assembly. There have been a large variety of Seat Assemblies that have been built. A preferred embodiment is shown in FIGS. 3A–D. All the pieces of FIG. 3A make up the Seat Assembly, with the exception of 14, the Seat Beam. The Seat Beam is a portion of the frame of the bicycle. The Seat Assembly slides on the Seat Beam to accommodate the full range of the height of the riders. There are three purposes of the seat assembly: to adjust for the rider's height, by sliding the Seat Assembly up or down on the Seat Beam 14, to adjust the seat saddle 10 closer to or farther away from the hip support 19 and to permit tilting of the seat with respect to the horizontal.

The Seat includes the saddle 10, the springs 13, the wire under carriage 20, and the tilt adjustment 18, 21 and 22. (21 is visible only in FIG. 3B). This entire Seat may be removed from the assembly by loosening bolt 17 and its clamping pieces 16. The loosening of bolt 17 allows the seat to be moved closer or farther away from the hip support 19.

Figure 3A:
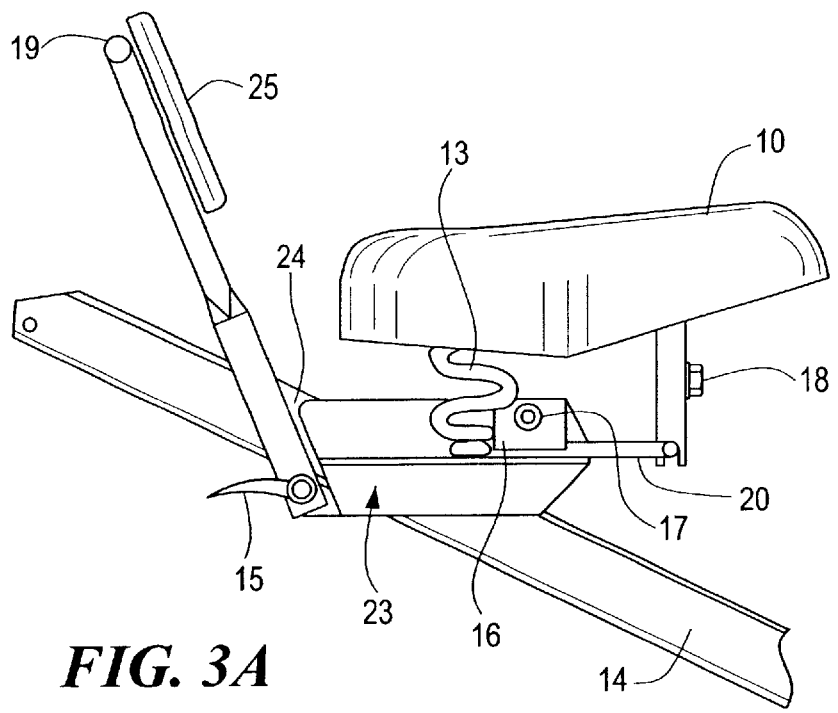
FIGS. 3A and B show 2 views of the seat assembly of the novel bicycle.
Figure 3B:
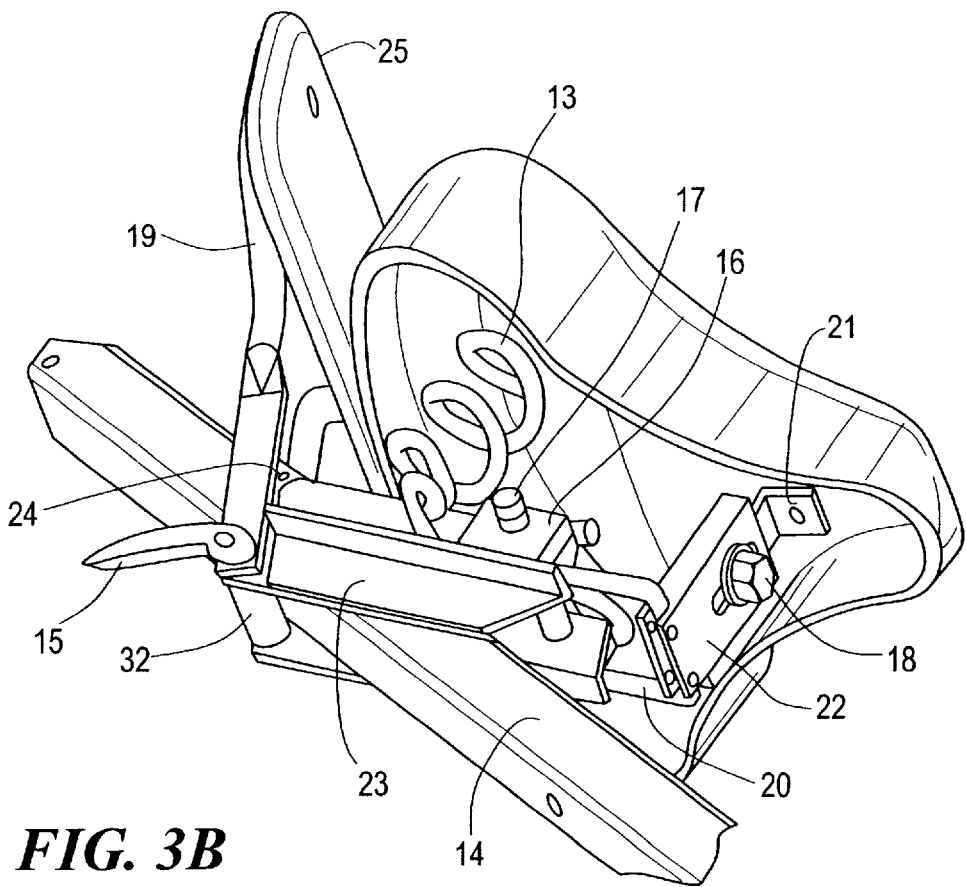
FIGS. 3C and 3D show components of the seat assembly.
Figure 3C:
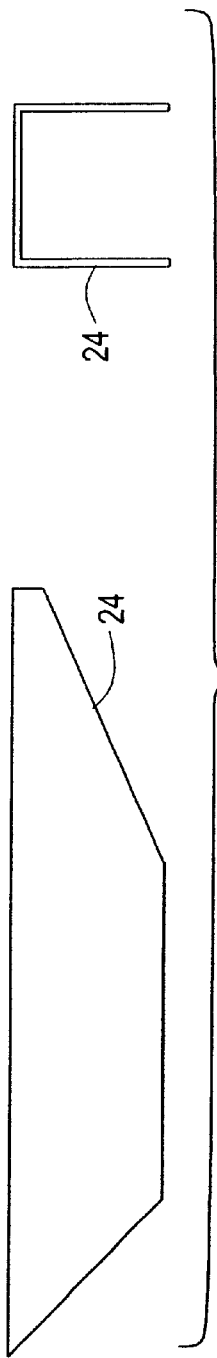
Figure 3D:
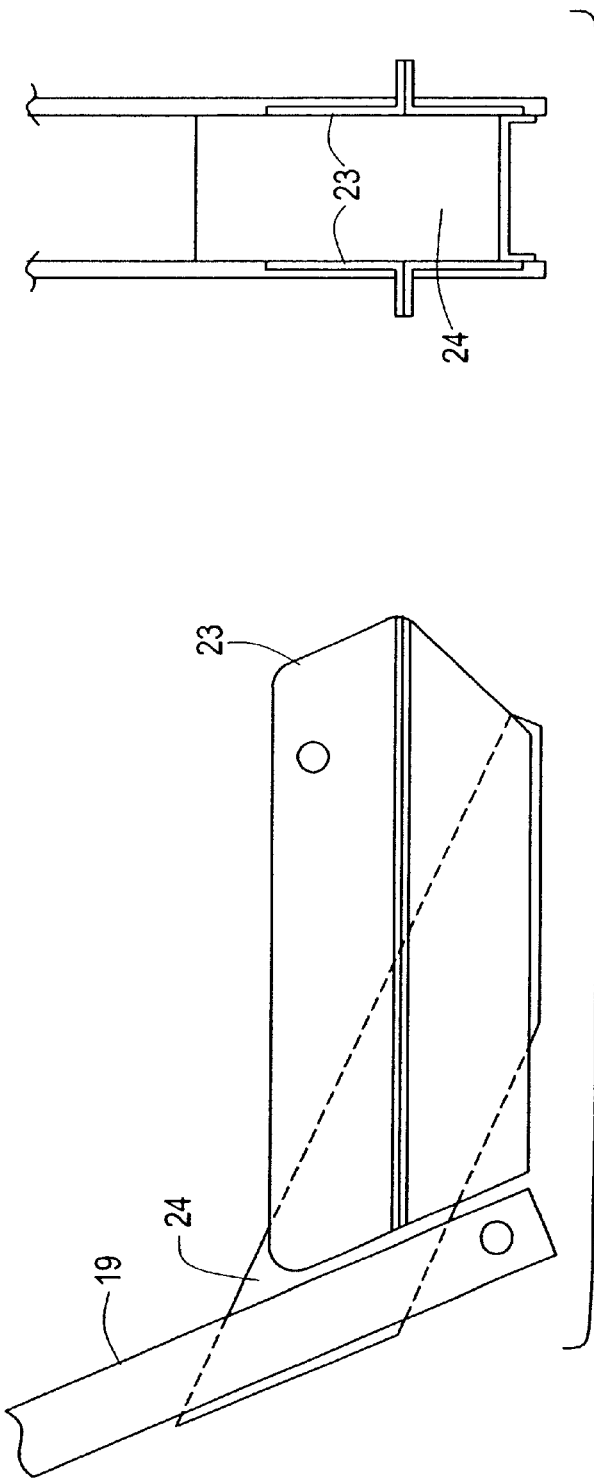

With the seat removed, the remaining portion of the seat assembly consists of a bracket that contains plates 23 (requires a right side and a left side) and slide channel 24. (Note that FIG. 3C shows the front and side views of the slide channel.) The seat assembly also includes a hip support 19 and hip plate 25. The slide channel, right and left plates and the hip support are spot welded together. (See FIG. 3D, which shows the front and side views of the right and left plates connected to the slide channel.) The hip plate is made of plywood or of plastic, is covered with a foam pad and cloth cover and is fastened to the hip support by means of screws or bolts.

The Seat Assembly is mounted onto the Seat Beam and firmly attached to the slide channel which provides a sliding fit to the Seat Beam. Two holes are provided in the hip support (one on the right side and one on the left side). The right side hole is in the middle of the handle 15 of a conventional quick release clamp in FIG. 3A. Adjustment of the location of the Seat Assembly on the Seat Beam is made by the use of a special quick release clamp (see next section number 5).

The third adjustment required of the seat assembly is that of tilting the seat. In most conventional bicycles the wire undercarriage is a single piece that connects the springs 13 directly to the front of the seat. In this design the wire undercarriage is connected to the front of the seat by means of the two pieces 21 and 22 of FIG. 3B. The two pieces are locked together by the use of bolt or screw 18. If the bolt is loosened the two mating pieces, 21 and 22 may be separated farther apart (raises front of saddle) or moved together (lowers the front of the seat).

Figure 4A:
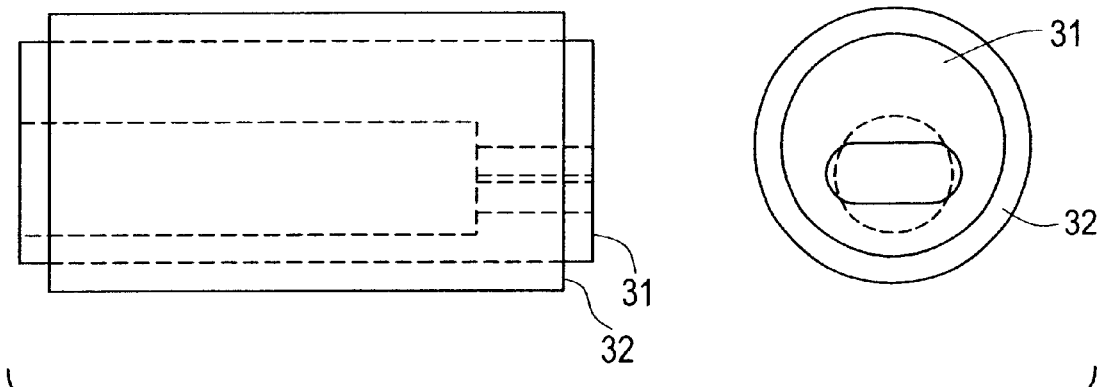
FIGS. 4A, B and C show details of the cam assembly of the bicycle.

5. Quick Release Clamp. A traditional quick release clamp provides a clamping force in one dimension only. Quick release clamps are used on the axles of wheels and on some seat posts to provide rapid change. The clamp used in this design is a special type of quick release mechanism. This special clamp provides clamping action in two dimensions (orthogonal in nature). This double acting clamp is shown in FIGS. 4A, 4B and 4C.

A second cam is added to the quick release clamp (QRC). This cam is shown in FIG. 4A. This cam consists of a machined piece (typically aluminum) 31 that is covered with a tube of polyvinyl chloride (PVC) 32. These pieces fit on the shaft 36 of the QRC as shown in FIG. 4C. In order to rotate this cam, the shaft 36 has been made non circular by machining two flats on the treaded portion of the shaft 39. Similarly, the hole in this cam 31 has been made non circular by machining a hole that yields a sliding fit on the major portion of the shaft 36 and then the remaining portion of the cam is machined to provide a sliding fit to the machined flats on the shaft 36. A pin 38 (or alternate connector) connects the handle 15 to the shaft 36.

Figure 4B:
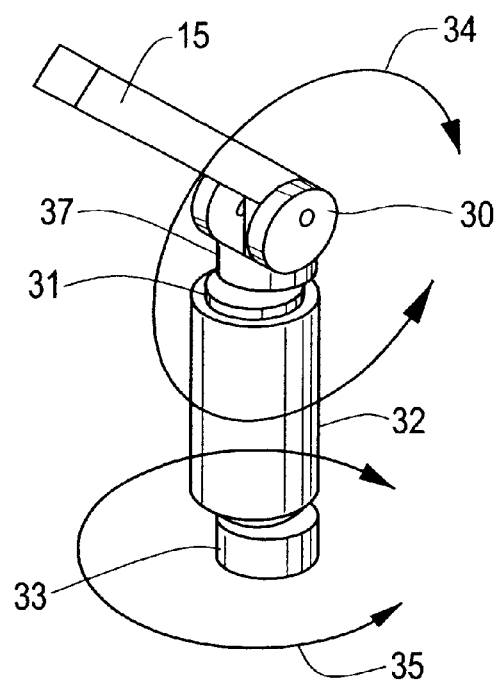
Figure 4C:
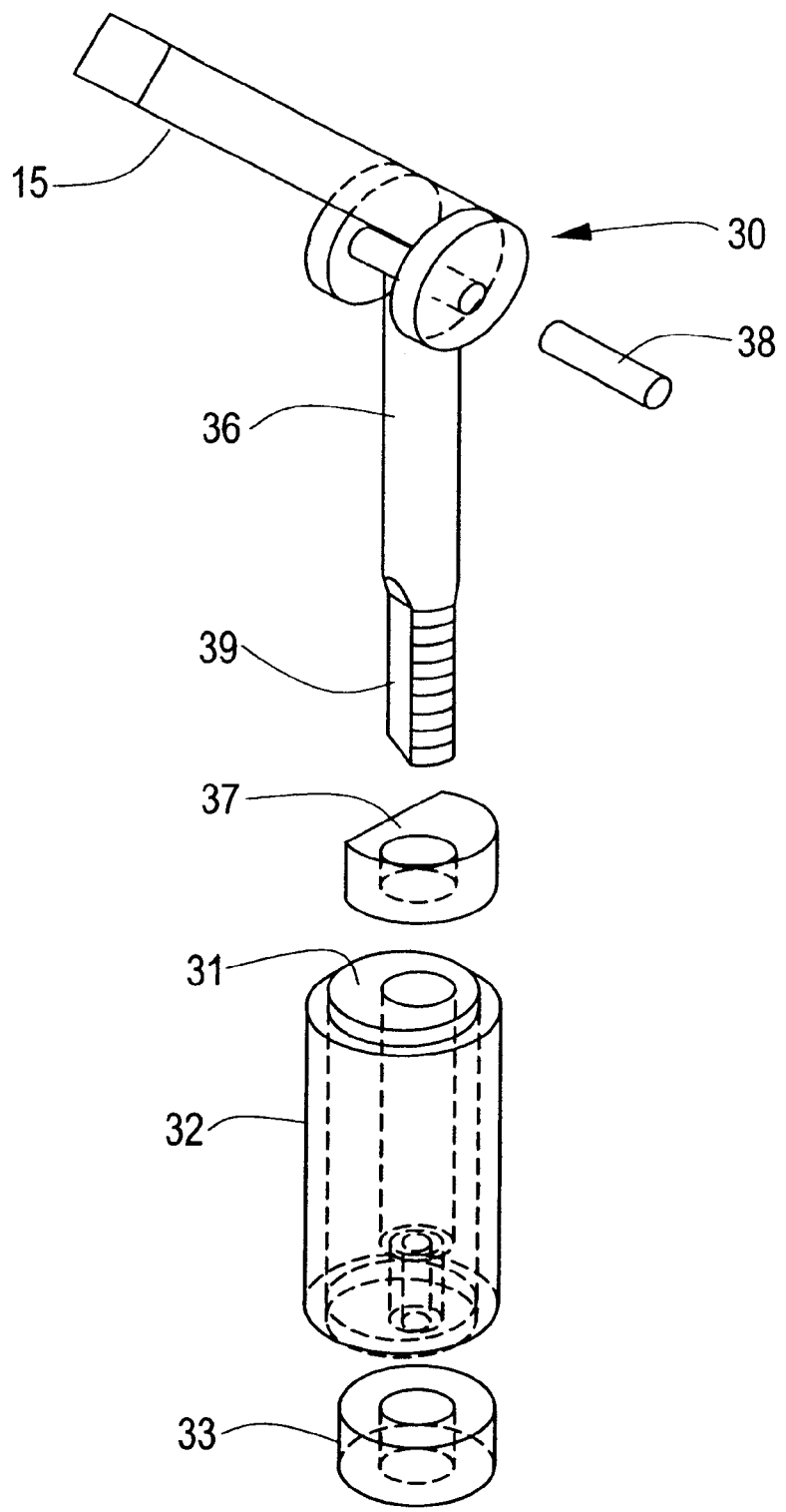

As shown in FIG. 4B, there are two different camming actions. The typical camming action is provided by rotation of the handle 15 as demonstrated by the circular motion 34. This motion provides clamping action to compress the space between washer 37 and nut 33, thus providing tightening by friction against the sides of the Seat Beam. In modern QRC design the cam 30 is cast or machined as an integral part of the handle 15. The other camming action occurs if the rotation is as shown by 35 in FIG. 4B. This rotation is orthogonal to 34. Rotation as shown by 35 actuates cam 32 and causes the entire seat assembly to be locked to the Seat Beam 14. The locking action slightly compresses the covering 32 between the metal part 31 and the Seat Beam 14, thus providing tightening by friction against the bottom of the Seat Beam. When rotation 35 is completed the handle may be rotated in the manner of 34 and the cam 31 and its covering 32 is locked. Those versed in the art will realize that many different forms may be employed for the manufacture of shaft 36 and matching hole or portions thereof of holes in the Cam 32. Alternatives in securing the seat to the Seat Beam can be achieved by modifying the cam and include (1) relying solely on friction against the side of the Seat Beam, (2) relying solely on friction against the bottom of the Seat Beam, and (3) relying on friction both against the sides and bottom of the Seat Beam.

6. Handlebar and stem. There were no commercially available parts available to satisfy the requirements for the handlebar and stem. The Stem is longer than currently available stems and furthermore may be mounted backwards compared to normal use. The handlebars are formed to provide a proper fit for the rider. It is of interest to note that the handle bar and the stem can be combined into one unit. There is less variability in this use, but most riders can achieve a comfortable result.

7. Gearing. Two different types of gearing have been used. Since these parts are purchased there will be little discussion here. One system is described as a three by six. This system uses three rings on the crank and six cogs on the rear wheel. The range of diameter on the cogs on the rear wheel is 2.0. The rear wheel uses a "free hub". The second system is described as a two by seven. In this system there are two rings on the crank and seven cogs on the rear wheel. This unit employs a cassette unit on the rear wheel. The range of diameter of the cogs on the rear wheel is approximately 2.7.

8. Other variations. A picture of the bicycle described above is shown in FIG. 1. One of the unique features of this design is the use of a square tube as the Seat Beam. The specified tube has rounded corners for safety and for better paint adhesion. Sharp corners chip easily. Other shapes have been considered. Round tubes may be better strength for the same weight but clamping to a round tube and achieving a level seat is more difficult. Other shapes such as a rounded tube with a flat bar attached under it are useful. A trapezoidal shape with the small portion facing up, rectangular or triangular tubes, oval shapes and extruded aluminum are examples of possible variations.

The use of a Seat Beam that is roughly a triangular shape with rounded corners permits a superior clamping technique than a square tube. With a triangular tube of the same overall width and radii of 0.250 at the three corners a 25% savings in the weight (mass) of the Seat Beam results. Moreover, the clamping force with an appropriate seat mechanism results in a clamping action that locks the seat assembly to the beam in an entire plane (both horizontally and vertically to the Seat Beam).

Some alternatives in the bicycle include, but are not limited to, the following:

The double acting cam that is shown could easily be replaced by a system with a series of discrete holes and a clevis pin or bolt.

A smaller rear wheel can be used (20" or less).

Shipment in two containers would allow the design to be scaled up to fit larger persons.

The top and down tubes could be replaced by a single tube.

The front end of the bike may use other angles of the head tube and a different rake or offset of the front fork.

The use of a fairing or a partial fairing (low air drag component in the front of the bicycle).

A children's bike, that fits persons between 3.5 feet and 5 feet in height, has been designed and tested. The frame uses the chain stay assembly shown in FIG. 2B. An adult size bike frame with this same feature has also been built.

The adult sized bike uses a chain lifter to lift the bottom portion of the chain higher off of the ground.

The use of a Seat Assembly with the saddle and hip pad integrated into one unit.

Other alternatives that are not inconsistent with the current invention will be apparent to those versed in the art.

I claim:

1. An upright adjustable bicycle, comprising
   (a) a fixed frame support structure for a rider consisting essentially of a triangle formed by a Seat Beam, Chain Stays, and Seat Stays, said triangle being reinforced by a Mid Tube, the angle between said Seat Beam and the ground being between approximately 18 and 40 degrees, with pedals connected at the lower end of said Seat Beam,
   (b) an adjustable seat assembly mounted on said Seat Beam, wherein said seat assembly slides on said Seat Beam to accommodate the full range of the height of said riders, said seat assembly being further adjustable to accommodate different sizes of seated riders, and (c) an adjustable handlebar.

2. The upright adjustable bicycle of claim 1, wherein (a) said seat assembly is adjusted to a position such that the feet of said seated rider are close enough to the ground to allow said rider to put either foot quickly and fully on the ground in a location outward of said pedals to enable said rider to stabilize himself and the bicycle in the event of lateral tipping of said bicycle and (b) the center of gravity of said seated rider is such that said rider is unlikely to be thrown over the handlebar during sudden braking.

3. The upright adjustable bicycle of claim 2, wherein said Seat Beam is inclined at an angle of approximately 23 degrees to the ground, in a bicycle having a 24" rear wheel.

4. The upright adjustable bicycle of claim 1, wherein said seat further comprises (a) a double action cam or (b) a series of discrete holes with a pin or bolt.

5. The upright adjustable bicycle of claim 1, wherein said bicycle can be partially disassembled easily to fit in a container having a maximum size of 130 inches in length and girth combined, with a maximum length of 108 inches per package.

6. The upright bicycle of claim 2, wherein said seat assembly of said bicycle is adjusted to a position to enable said rider to straddle said frame assembly and lift said bicycle over a curb without having to dismount.

7. The upright bicycle of claim 2, wherein said seat assembly of said bicycle is adjusted to a position to enable said rider to fully extend his legs during pedaling and provides an acceptable hip support, thus allowing for efficient usage of strength from leg muscles.

8. The upright bicycle of claim 4 wherein said seat comprises a saddle, a hip support, said saddle and hip support being adjustable (a) as a unit in their distance from the pedals of said bicycle and (b) individually in relation to each other, and wherein the angle of said saddle is adjustable.

9. The upright bicycle of claim 4 wherein said double action cam allows tightening as a result of (a) friction against the sides of the Seat Beam, (b) friction against the bottom of said Seat Beam, or (c) friction as a result of friction against both the sides and bottom of the Seat Beam.

10. The upright adjustable bicycle of claim 1, wherein said Seat Beam is square or triangular, and wherein said Seat Beam has rounded corners.

11. The upright adjustable bicycle of claim 1 wherein the angle between said seat beam and the ground is 20 to 30°.

12. The upright adjustable bicycle of claim 1 wherein the angle between said seat beam and the ground is approximately 23°.

13. The upright adjustable bicycle of claim 1, wherein the lower end of said Seat Beam is lower than the top of the front wheel of said bicycle.

14. The upright adjustable bicycle of claim 1, wherein the handlebars are above the seat and pedals of said bicycle.

15. The upright adjustable bicycle of claim 1, wherein said adjustment in said seat assembly further comprises:

(a) an adjustment of the seat saddle location with respect to the hip support and (b) an adjustment in the tilt of said seat saddle.

16. The upright adjustable bicycle of claim 1, wherein (a) when said seat assembly is adjusted to a position such that ergonomic efficiency with regard to pedaling is achieved, the feet of said seated rider are close enough to the ground to allow said rider to put either foot quickly and fully on the ground in a location outward of said pedals to enable said rider to stabilize himself and the bicycle in the event of lateral tipping of said bicycle and (b) the center of gravity of said seated rider is such that said rider is unlikely to be thrown over the handlebar during sudden braking.

17. An upright adjustable bicycle comprising:

a. a fixed frame support structure for a rider consisting essentially of a triangle formed by a Seat Beam, Chain Stays, and Seat Stays, said triangle being reinforced by a Mid Tube, the angle between said Seat Beam and the ground being between approximately 18 and 40 degrees, with pedals connected at the lower end of said Seat Beam, b. an adjustable seat assembly mounted on said Seat Beam, wherein said seat assembly slides on said Seat Beam to accommodate the full range of the height of said riders, said seat assembly being further adjustable to accommodate different sizes of seated riders, and (c) an adjustable handlebar, wherein said seat assembly is adjusted to a position (1) allowing said rider, when needed for stability, to easily place his feet on the ground and (2) which places the center of gravity of said rider in a position to reduce the likelihood that said rider will be thrown over the handlebar during sudden braking.

18. A method of transportation comprising the use of an upright bicycle, said bicycle comprising (a) a fixed frame support structure for a rider consisting essentially of a triangle formed by a Seat Beam, Chain Stays, and Seat Stays, said triangle being reinforced by a Mid Tube, the angle between said Seat Beam and the ground being between approximately 18 and 40 degrees, with, pedals connected at the lower end of said Seat Beam, (b) an adjustable seat assembly mounted on said Seat Beam, wherein said seat assembly slides on said Seat Beam to accommodate the full range of the height of said riders, said seat assembly being further adjustable to accommodate different sizes of seated riders, and (c) an adjustable handlebar.

* * * * *